United States Patent Office 3,385,961
Patented May 28, 1968

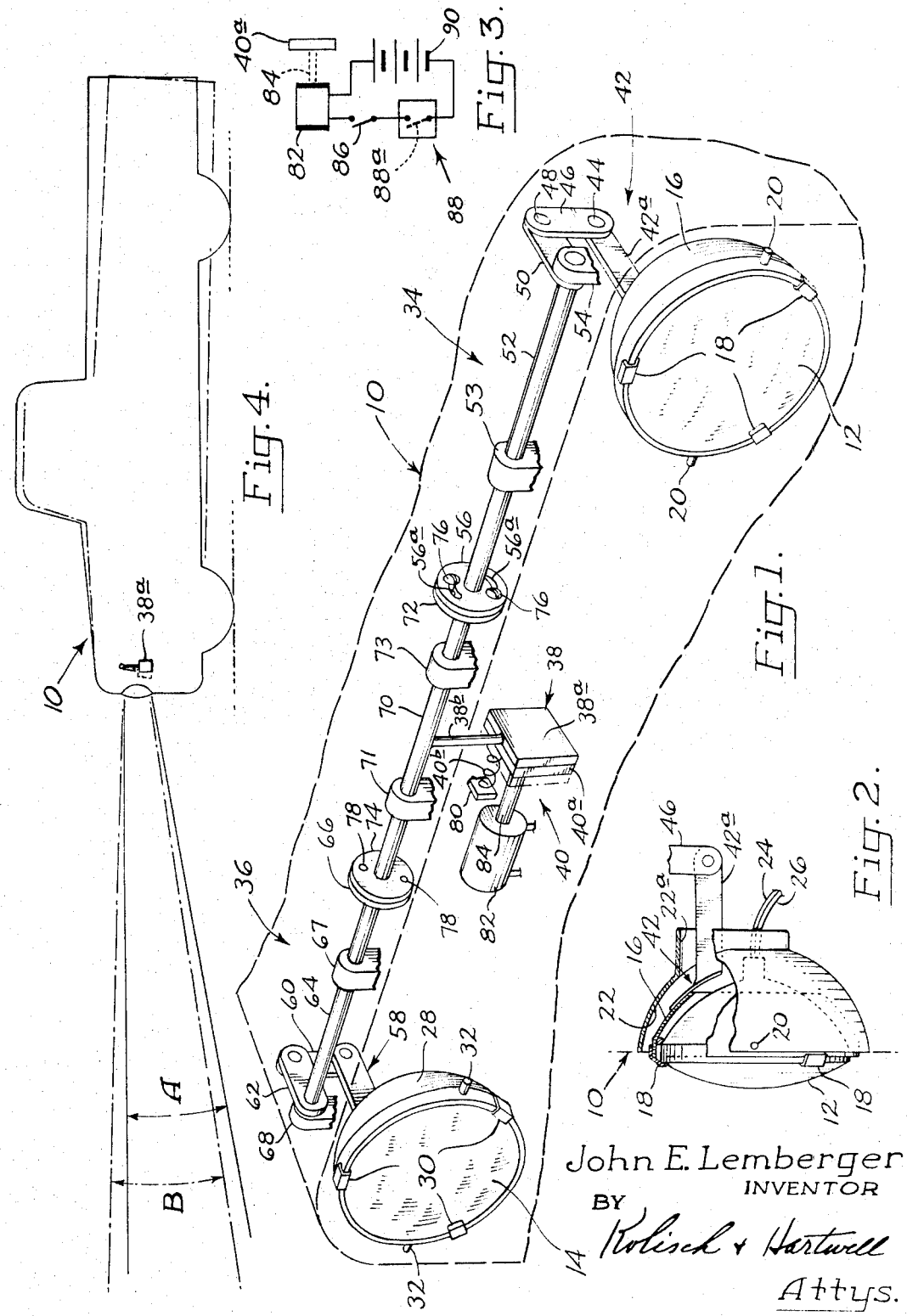

3,385,961
HEADLIGHT ADJUSTING APPARATUS
John E. Lemberger, Long Creek, Oreg. 97856
Filed Nov. 22, 1966, Ser. No. 596,214
6 Claims. (Cl. 240—7.1)

ABSTRACT OF THE DISCLOSURE

In a vehicle including headlights mounted for pivotal movement about axes extending transversely of the vehicle body, apparatus for adjusting the angular positions of such headlights relative to the body to compensate for tilting thereof relative to the ground. The apparatus includes a pendulum which may swing, due to the action of gravity thereon, with tilting of the vehicle body, such pendulum being positively connected through shafts and links to the headlights to produce related pivotal movements therein. A solenoid-actuated friction member is selectively engageable with the pendulum to lock it in place relative to the vehicle body, with the headlights then remaining in fixed positions relative to the body.

---

This invention relates to vehicle headlights, and more particularly, to apparatus for adjusting the angular positions of such headlights relative to the body of a vehicle to compensate for tilting of the vehicle body relative to the ground.

For safe driving under circumstances where headlights must be used, it is important that the headlights shine into a region generally in front of the vehicle in a manner providing adequate lighting of the roadway ahead without shining directly into the eyes of drivers of oncoming vehicles. Tilting of the body of a vehicle relative to the ground, due to different load conditions, or for other reasons, may result in improper aiming of the headlights, causing them to shine either above or below this region.

A general object of the present invention is to provide novel apparatus for adjusting the positions of vehicle headlights to compensate for such tilting of a vehicle body.

More particularly, an object of the invention is to provide, for a vehicle having headlights mounted for pivotal movement about horizontal axes extending transversely of the vehicle, novel means which produces pivotal adjustment of the headlights about such axes, with the extent of such adjustment directly related to the extent of any fore and aft tilting which may have occurred in the vehicle body. According to the invention, such adjustment is that which is required to position the headlights so that they are aimed properly.

A further object is to provide such apparatus wherein the means producing adjustment of the headlights includes a gravity-biased pendulum which responds to tilting of a vehicle body to cause correctional pivotal movement of the headlights, and locking means which is releasably engageable with the pendulum to lock it in place relative to the vehicle body once an appropriate adjustment has been made.

As contemplated herein, headlight adjustment is made with the vehicle on level ground and after loading or other occurrence has taken place producing a change in weight distribution on the vehicle's suspension system resulting in tilting of the vehicle body. With headlight adjustment made the vehicle is in condition to travel over a road, and during such travel the position of the headlights on the vehicle body remains unchanged. Readjustment of headlight position normally is done only after another change in weight distribution occurs resulting in another change in the position of the vehicle body on the vehicle's suspension system. The pendulum is locked in place after an adjustment is made, to prevent swinging of the pendulum during vehicle travel over the ground.

Yet another object is to provide apparatus of the type described which enables both headlights of a vehicle to be adjusted simultaneously, and which enables the driver to effect such adjustment from within the cab of the vehicle.

These and other objects and advantages attained by the invention will become more fully apparent as the description which follows is read in conjunction with the accompanying drawings, wherein:

FIG. 1 illustrates, in perspective, headlight adjusting apparatus as contemplated herein mounted on the front portion of a pick-up truck;

FIG. 2 is a side view taken from the right-hand side of FIG. 1, with portions broken away, illustrating a mounting for a headlight as contemplated herein;

FIG. 3 illustrates, schematically, a circuit employed to control operation of a locking device forming part of the apparatus of FIG. 1; and FIG. 4 is a side view illustrating, on a reduced scale, the truck partially shown in FIG. 1, with the body of the truck shown in one position in solid outline, and in a different tilted position in dashed outline.

Turning now to the drawings, and with reference first to FIGS. 1 and 2, illustrated generally in dashed outline at 10 is the front portion of the body of a vehicle, such as a pick-up truck. Mounted on opposite sides of the truck adjacent the front thereof are headlights 12, 14.

Considering the mounting for headlight 12, the headlight is received within a receptacle 16 which conforms generally to the contour of the back of the light, and is held snugly in place inside the receptacle by means of suitable spaced fasteners 18. These fasteners are commercially available devices which enable a certain amount of adjustment of the headlight within the receptacle.

Provided on diametrically oppostie sides of the receptacle are radially outwardly projecting pins 20. The receptacle is mounted on the truck body, within a substantially cup-shaped forwardly-facing well 22 (FIG. 2), with pins 20 received within suitable pivot mountings (not shown) provided adjacent diametrically opposite sides of the well. The pins accommodate pivotal movement of receptacle 16, and headlight 12, about a substantially horizontal axis extending transversely of the vehicle. Well 22 has an opening 22a adjacent the rear thereof, and through this opening, conductors 24, 26 extend to connect electrically with the headlight.

The mounting for headlight 14 on the opposite side of the truck is similar to that just described for headlight 12. Thus, the headlight is received within a receptacle 28 which corresponds to receptacle 16, and is held snugly in place within the receptacle by means of fasteners 30 which correspond to fasteners 18. Pin 32 corresponding to pins 20 provide a pivot mounting for the headlight. Headlight 14 and receptacle 28 are also pivotable about a substantially horizontal axis extending transversely of the vehicle.

Means for adjusting the angular positions of headlights 12, 14 relative to the truck as contemplated herein comprises, generally speaking, connecting means 34, 36, gravity-biased means 38, and locking means 40.

Connecting means 34 comprises an element 42 suitably mounted on receptacle 16 adjacent the top and rear thereof. Element 42 has a rearwardly extending arm 42a extending through well opening 22a, and the rear end of arm 42a is pivotally connected at 44 to one end of an elongated link 46. The other end of link 46 is pivotally connected at 48 to one end of an elongated lever arm 50 which is mounted on and extends radially outwardly from one end of an elongated, horizontal shaft 52 that extends transversely of the truck. The shaft is journaled in suitable bearings 53, 54 which are appropriately mounted on the vehicle body, and adjacent its other end, the shaft carries a flange member 56 having a pair of arcuate slots 56a.

Connecting means 36 is similar in construction to connecting means 34, with element 58, link 60 and lever arm 62 corresponding to previously described element 42, link 46, and lever arm 50, respectively. Lever arm 62 is mounted adjacent one end of a shaft 64 corresponding to shaft 52, and the other end of shaft 64 carries a flange member 66 which corresponds to flange member 56. Shaft 64 is journaled in suitable bearings 67, 68 which correspond to bearings 53, 54 for shaft 52.

Extending between and connecting flange members 56, 66 is an assembly including an elongated shaft 70 journaled in suitable bearings 71, 73, and a pair of flange members 72, 74 suitably mounted adjacent the opposite ends of this shaft. Flange member 72 is connected to member 56 by means of fasteners 76 which extend through slots 56a and which are screwed into suitable threaded bores provided in flange 72. Flange member 74 is connected to member 66 in a similar manner by fasteners 78. Slots 56a in member 56, and the corresponding slots (not shown) in flange 66, enable a certain amount of angular adjustment to be made between shafts 52, 64, and shaft 70.

Gravity-biased means 38 comprises a weighted element, or pendulum device, 38a connected to shaft 70 approximately midway between the shaft's opposite ends by means of a connecting rod 38b. Upon tilting of the vehicle body's longitudinal axis relative to the ground, the pendulum device swings, with rotation of shaft 70 about a horizontal axis extending transversely of the vehicle.

Locking means 40 comprises a friction pad, or element, 40a suitably mounted adjacent one side of weighted element 38a, and a biasing spring 40b interposed between pad 40a and a support member 80 which is suitably mounted on the body of truck 10. Spring 40b functions to urge pad 40a into frictional engagement with element 38a.

According to the invention, power-actuated means is provided for moving pad 40a out of engagement with element 38a. In the embodiment illustrated, this comprises an electrical solenoid 82 which is suitably mounted on the vehicle body and which is appropriately connected to pad 40a by means of a connecting rod 84. With the solenoid de-energized, pad 40a is held against element 38a by means of spring 40b. Upon energizing of the solenoid, the pad is shifted away from element 38a.

Referring for a moment to FIG. 3, in the embodiment of the invention shown, solenoid 82 is connected electrically to the truck's electrical system whereby the solenoid may be energized. Thus, solenoid 82 forms part of a series circuit which includes a control switch 86 that may be suitably mounted within the cab of the truck body, a normally open switch 88a forming part of the truck's ignition switch unit 88, and the truck's battery 90. Switch 88a closes upon operation of the ignition switch, and with this switch closed, closing of control switch 86 causes energizing of the solenoid.

Explaining now how the described apparatus may be used to adjust the headlights, and explaining first of all certain initial adjustments which are made in the apparatus, with the truck unloaded and sitting on level ground, as illustrated in solid outline in FIG. 4, solenoid 82 is energized to move pad 40a away from element 38a, and bolts 76, 78 are loosened. Upon separation of pad 40a and element 38a, the weighted element swings to a position where it depends straight down from shaft 70 with turning of shaft 70. When the weighted element comes to rest in such a position, the solenoid is de-energized whereupon the pad again engages the weighted element and prevents any further swinging of the element relative to the vehicle. Shafts 52, 64 are then adjusted relative to shaft 70, and bolts 76, 78 tightened, to position the headlights so that they will shine into the proper region ahead of the truck. Fine adjustment of the positions of the headlights in the receptacles is accommodated by fasteners 18, 30. With the headlights thus adjusted, upon operation, they shine properly into a region ahead of the truck indicated at A in FIG. 4.

If the truck is now loaded so that the truck body tilts on the truck's suspension system, as indicated in dashed outline in FIG. 4, with element 38a locked in place, the element will assume a position substantially such as that shown in dotted outline for the element in FIG. 4. The headlights will shine into a region indicated at B in front of the truck. To adjust the headlights so that they again shine properly into region A, and with the truck still on level ground, the ignition switch is operated to close switch 88a, and control switch 86 is closed to energize solenoid 82. Upon energizing of the solenoid pad 40a moves away from weighted element 38a, and, due to the force of gravity, the element returns to the position where it is illustrated in solid outline in FIG. 4.

Upon such swinging of element 38a, shaft 70, 52, 64 turn in a direction to produce pivoting of the receptacles, and hence the headlights, to compensate for the tilt of the vehicle body. Specifically, when element 38a is again at rest, and depending straight down from shaft 70, the headlights again shine into region A. When this adjustment has been made, switch 86 is opened to de-energize solenoid 82 whereupon pad 40a again engages element 38a locking the element in place on the vehicle. A similar adjustment may be made to compensate for tilting of the truck body in the opposite direction.

Thus, the invention provides means whereby adjustments are easily made in the positions of both headlights of a vehicle to compensate for any tilt of the vehicle body. By locking weighted element 38a in place, no adjustments occur upon the vehicle traveling.

With control switch 86 mounted in the cab of the truck, a driver may conveniently cause an adjustment to be made without having to leave the truck. It should be apparent that the invention is adaptable to a wide variety of vehicles.

While an embodiment of the invention has been described herein, it is appreciated that variations and modifications are possible without departing from the spirit of the invention. It is desired to cover all such variations and modifications which would be apparent to one skilled in the art, and that come within the scope of the appended claims.

It is claimed and desired to secure by Letters Patent:

1. In a vehicle having a headlight and means mounting the headlight for pivotal movement about a substantially horizontal axis that extends transversely of the vehicle,
   means for adjusting the angular position of said headlight relative to said vehicle comprising
   gravity-biased means mounted on said vehicle swingable relative to said vehicle upon tilting of the latter to different angular positions relative to the ground,
   releasable locking means releasably engaging said gravity-biased means inhibiting any swinging of the latter relative to the vehicle while so engaged, and
   means positively connecting said headlight and said gravity-biased means producing, with said locking means disengaged from said gravity-biased means and upon swinging of said gravity-biased means relative to said vehicle, directly related pivotal movement of said headlight about said axis, with said headlight moving in the same angular direction as said gravity-biased means.

2. The apparatus of claim 1, wherein said gravity-biased means comprises a pendulum device which is swingable about an axis substantially paralleling said first-mentioned axis.

3. The apparatus of claim 2, wherein said locking means comprises a friction element releasably engaged with said pendulum device, and biasing means operatively connected to said element urging it to a position engaging said device.

4. The apparatus of claim 3, wherein said adjusting means further comprises power-actuated means operatively connected to said friction element actuatable to urge said element to a position where it is disengaged from said pendulum device.

5. The apparatus of claim 4, wherein said power-actuated means comprises an electrical solenoid.

6. The vehicle of claim 2, which further includes a second headlight and means mounting the second headlight for pivotal movement about a substantially horizontally axis that extends transversely of the vehicle, and said adjusting means further comprises means positively connecting said second-mentioned headlight and said gravity-biased means, whereby swinging of said gravity-biased means also produces related pivotal movement of said second-mentioned headlight, thus to produce simultaneous like adjustment of both headlights.

References Cited

UNITED STATES PATENTS

| | | | |
|---|---|---|---|
| 1,284,345 | 11/1918 | Howd | 240—61.9 |
| 1,655,356 | 1/1928 | Crowell | 240—62.2 |
| 3,177,355 | 4/1965 | Trowbridge | 240—62.3 |

NORTON ANSHER, *Primary Examiner.*

ROBERT A. SCHROEDER, *Assistant Examiner.*